United States Patent [19]

Mauldin et al.

[11] 4,251,392

[45] Feb. 17, 1981

[54] REFORMING WITH MULTIMETALLIC CATALYSTS

[75] Inventors: Charles H. Mauldin; William C. Baird, Jr., both of Baton Rouge, La.

[73] Assignee: Exxon Research & Engineering Co., Florham Park, N.J.

[21] Appl. No.: 34,596

[22] Filed: Apr. 30, 1979

[51] Int. Cl.³ .................. B01J 27/04; B01J 27/10; B01J 23/89
[52] U.S. Cl. .................................. 252/439; 252/441; 252/442; 252/466 PT; 252/472; 252/474; 208/138; 208/139
[58] Field of Search ............... 252/441, 442, 466 PT, 252/472, 474, 439

[56] References Cited

U.S. PATENT DOCUMENTS

| 3,173,856 | 3/1965 | Burton et al. | 252/466 PT X |
| 3,415,737 | 12/1968 | Kluksdahl | 252/466 PT X |
| 3,729,408 | 4/1973 | Carter et al. | 252/474 X |
| 3,933,622 | 1/1976 | Mitchell et al. | 252/439 X |
| 4,049,576 | 9/1977 | Kovacs et al. | 252/441 |
| 4,124,491 | 11/1978 | Antos et al. | 252/441 X |

Primary Examiner—Patrick Garvin
Attorney, Agent, or Firm—Llewellyn A. Proctor

[57] ABSTRACT

A catalyst constituted of a composite which includes hydrogenation-dehydrogenation components comprised of palladium and platinum in total concentration ranging from about 0.2 to about 0.6 percent, in molar concentration of palladium:platinum ranging from about 1:1 to about 10:1 composited with an inorganic oxide support. In its preferred aspects the catalyst composite also contains rhenium, and more preferably a small amount of copper is added to suppress hydrogenolysis, which is particularly acute in reforming during the early period of operation when the catalyst is placed on stream, i.e., at the startup of a reactor; and process of employing such catalysts in reforming.

16 Claims, 1 Drawing Figure

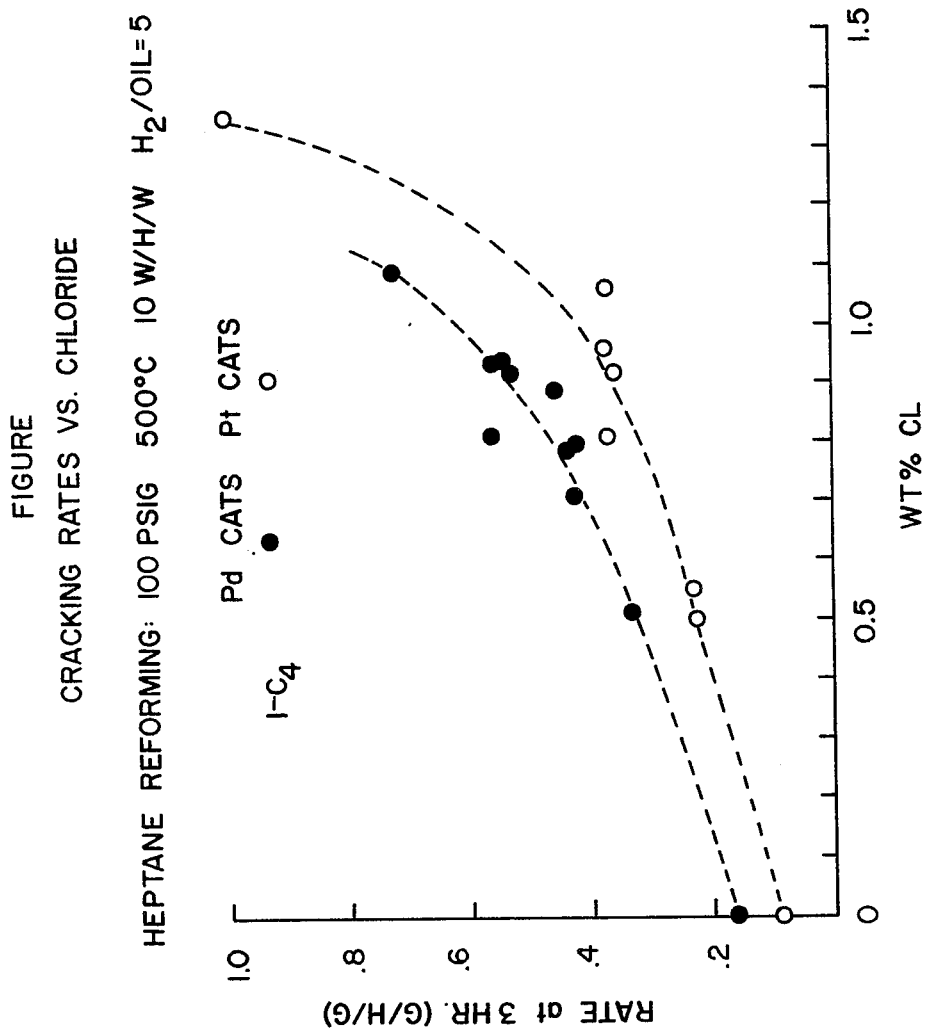

4,251,392

REFORMING WITH MULTIMETALLIC CATALYSTS

BACKGROUND OF THE INVENTION AND PRIOR ART

Catalytic reforming, or hydroforming, is a process well known to the petroleum refining industry for improving the octane quality of naphthas and straight run gasolines. In a typical process, a series of reactors are provided with fixed beds of catalyst which receive upflow or downflow feed, and each reactor is provided with a preheater or interstage heater, because the reactions which take place are endothermic. A naphtha feed, with hydrogen, or recycle gas, is cocurrently passed through a reheat furnace and reactor, and then in sequence through subsequent heaters and reactors of the series. The vapor effluent from the last reactor of the series is a gas rich in hydrogen, which usually contains small amounts of normally gaseous hydrocarbons, from which hydrogen is separated from the $C_5+$ liquid product and recycled to the process to minimize coke production; coke invariably forming and depositing on the catalyst during the reaction.

Reforming catalysts are recognized as dual functional, the catalyst composite including a metal, or metals, or a compound or compounds thereof, providing a hydrogenation-dehydrogenation (hydrogen transfer) function and an acidic component providing an isomerization function. The platinum group metals (ruthenium, osmium, rhodium, iridium, palladium and platinum), particularly platinum, have been widely used in commercial reforming operations, these metals being composited with an inorganic oxide base, particularly alumina; and in recent years promoters such as iridium, rhenium, germanium, tin, etc., have been added, particularly to platinum, to enhance one or more of certain of the characteristics which a good reforming catalyst must possess—viz., activity, selectivity, activity maintenance and yield stability. Rhenium has been found particularly useful in providing excellent $C_5+$ liquid yields and stability. Halogen, e.g., chlorine, is generally added to provide the required acid function.

Palladium is widely discussed in the technical and patent literature as a hydrogenation-dehydrogenation component, and is generally considered as a substitute for platinum. Nevertheless, despite the considerably lower cost of palladium, as contrasted with platinum, this metal has never been extensively used, if at all, in commercial reforming operations. The basic reason, among others, is that a palladium reforming catalyst is far less active than platinum and is deactivated all too rapidly under reforming conditions. For example, the substitution, or replacement, of platinum by an equal weight (or molar) concentration of palladium in a catalyst containing equal weight (or molar) concentrations of rhenium, e.g., a 0.3 wt. % Pd/0.3 wt. % Re catalyst, at start-up conditions can cause deactivation of the catalyst within about the first fifty hours on oil. The same effect is observed by comparison of catalysts otherwise similar except that they do not contain rhenium. Accordingly, despite its lower cost, palladium has not proven a useful metal in commercial reforming operations.

The principal reactions produced in reforming are dehydrogenation of naphthenes to produce the corresponding aromatic hydrocarbons; isomerization of n-paraffins to form branched-chain paraffins and isomerization of ring compounds, and dehydrogenation of the latter to form aromatics; dehydrocyclization of paraffins to form aromatics; and hydrocracking of high molecular weight feed constituents to form lower molecular weight, or lower boiling, constituents, the net effect of these reactions being to increase the concentration of aromatics and isomers, with consequent octane improvement of naphthas boiling within the gasoline range. Hydrogenolysis, however, a specific and severe form of hydrocracking which produces methane, can also occur; and hydrogenolysis is particularly acute in reforming with platinum-rhenium catalysts, particularly fresh or regenerated, reactivated platinum-rhenium catalysts, which are particularly hypersensitive.

During hydrogenolysis, exotherms of heat fronts are produced which pass through a catalyst bed at startup, i.e., when a new or freshly regenerated, reactivated platinum-rhenium catalyst is initially contacted with hydrocarbons at reforming temperatures. The temperature excursions or heat fronts are undesirable because the excessive heat often damages the catalyst, or causes excessive coke laydown on the catalyst with consequent catalyst deactivation and, if uncontrolled, may even lead to damage to the reactor and reactor internals. The phenomenon is troublesome in any type of reforming operation, but is particularly troublesome in cyclic reforming wherein one reactor of the series is a swing reactor which is used as a substitute for each of the other reactors so that the catalyst of each in turn can be regenerated, and reactivated. Because of the frequency with which the catalysts must be regenerated in cyclic reforming, as contrasted with other types of reforming units, hydrogenolysis greatly reduces the efficiency of the cyclic reforming process and simply cannot be tolerated.

Hydrogenolysis can be moderated by sulfiding, and consequently it is conventional to presulfide such catalysts prior to their use in reforming. Typically, the catalyst is charged into a reactor and then contacted with an admixture of hydrogen sulfide and an inert gas, e.g., nitrogen. However, whereas sulfiding moderates the type of cracking which suppresses methane formation it does little to reduce the formation of other $C_2+$ hydrocarbons gases, e.g., ethane, propane, butane and the like. This type of cracking too can cause the catalysts to become rapidly overheated when exposed, in the presence of hydrogen, at normal reaction conditions to hydrocarbons, to such extent that the catalyst itself can be overheated, sintered or otherwise damaged. Moreover, in sulfiding the catalyst special care must be taken to avoid oversulfiding because platinum-rhenium catalysts pose an acute sensitivity to feed sulfur which can drastically reduce the activity and selectivity of the catalyst; and, excessive amounts of deposited catalyst sulfur can find its way into the feed.

In copending Application Ser. No. 029,675, filed Apr. 13, 1979, however, there is disclosed a catalyst, and method for the preparation of a catalyst composition comprised of platinum, rhenium, halogen, and preferably sulfur, composited with an inorganic oxide support, or carrier, to which a small concentration of copper is added to improve the yield and stability of the catalyst in reforming, as contrasted with a platinum-rhenium catalyst otherwise similar except that the catalyst does not contain any copper. Copper is an essential component of such composition, it having been found that excessive $C_2+$ hydrocarbon gas formation could be suppressed by the use of small and critical concentrations of copper; and that added benefits could be obtained by the further addition of sulfur to the catalyst to suppress hydrogenolysis.

It is nonetheless a primary objective of the present invention to obviate these and other prior art deficiencies, particularly by providing new and improved catalysts, and a process for utilizing such catalysts for upgrading naphthas by reforming to produce higher octane gasolines.

A particular object is to provide a new and improved reforming process for effecting, at suitable reforming conditions, the production of high octane gasolines while minimizing hydrogenolysis and other type of hydrocracking which tend to produce methane and hydrocarbon gases of higher molecular weight than methane.

A more particular object is to provide more highly active, less sulfur sensitive reforming catalysts which require less halogenation and less rigorous feed sulfur specifications.

These and other objects are achieved in accordance with the present invention embodying a catalyst comprised of palladium to which platinum is added in small concentrations relative to the concentration of the palladium, composited with an inorganic oxide support, or carrier. The relatively small amount of platinum apparently acts to provide high stability as contrasted with a palladium catalyst, or catalyst otherwise similar except that it does not contain a platinum promoter, and apparently permits the palladium to provide benefits which include: preferential dehydrocyclization of paraffins to $C_6$ naphthenes, the desired aromatic precursors; less ring closure to form the undesired $C_5$ naphthenes; less isomerization of paraffins to their more refractory branched structures; less dependency on catalyst acidity to convert $C_5$ naphthenes; lower rate of coke formation; and the production of products richer in higher octane $C_9^+$ aromatics at the expense of lower octane $C_6$—$C_8$ aromatics. In other words, the activity of the palladium catalyst is apparently stabilized by the small amount of platinum without its masking, or altering the fundamental palladium character of the catalyst.

In the formation of these catalysts, high activity and stability, with low coke formation are obtained, and optimized, by the use of palladium-platinum loadings ranging from about 0.2 to about 0.6 percent, preferably from about 0.3 to about 0.4 percent, total palladium-platinum based on the total weight of the catalyst (dry basis); and at a molar ratio of palladium:platinum ranging from about 1:1 to about 10:1, preferably from about 2:1 to about 6:1. In general, this compositional range corresponds to about 1 to 60 mol % Pt with about 15 to 50 mol % Pt being preferred; about 15 to 40 mol % Pt being most preferred. Reforming with catalysts which contain palladium and platinum in concentrations which provide compositions outside these ranges gives inferior performance.

In its most preferred aspects, the catalyst additionally contains rhenium, and more preferably both rhenium and copper; and even more preferably it contains rhenium, copper and sulfur. The rhenium is present, generally, in concentration ranging from about 0.1 percent to about 2'/n percent, preferably from about 0.2 percent to about 0.6 percent, based on the weight of the catalyst (dry basis). Preferably, the palladium, platinum, and rhenium are employed in weight ratios of palladium plus platinum:rhenium ranging from about 0.15:1 to about 4:1, more preferably from about 0.50:1 to about 2:1; and most preferably is employed in substantially equal weight ratios when the total content of these metals ranges from about 0.3 percent to about 0.9 percent, based on the total weight of the catalyst (dry basis).

The copper component is conveniently added to the catalyst by impregnation. Suitably, a sufficient amount of a copper-containing compound is added to incorporate from about 0.01 to about 0.1 percent copper, preferably from about 0.025 to about 0.08 percent copper, based on the weight of the catalyst (dry basis). The exact concentration of the copper depends to some extent on the nature of the feedstock and reforming conditions, but it is important that the concentration of copper on the catalyst be controlled to the proper level. High concentration of copper acts as a poison and depresses catalyst activity. Preferably the copper is employed at mol ratios of copper:(palladium plus platinum plus rhenium) ranging from about 0.05:1 to about 0.4:1, more preferably from about 0.075:1 to about 0.35:1, and most preferably from about 0.1:1 to about 0.3:1.

Halogen is also a preferred component, the halogen content of the catalyst generally ranging from about 0.3 to about 0.9 percent, preferably from about 0.5 to about 0.8 percent, based on the weight of the catalyst (dry basis).

It is well known that platinum reforming catalysts require substantial acidity for optimum catalytic activity, and that the required acidity is normally imparted by the addition of chloride to the catalyst. The acidity is required to isomerize the $C_5$ naphthenes (produced by platinum catalyzed dehydrocyclization) to $C_6$ naphthenes, which are subsequently aromatized by dehydrogenation. In the absence of this acidity rapid deactivation of the catalyst occurs as a consequence of the coking tendency possessed by the $C_5$ naphthenes. The chloride level required for platinum catalysts is nominally about 1 wt. % with a range of 0.9-1.1 wt. % being typical; though some platinum based catalysts require even higher chloride levels approaching in some cases 1.3-1.6 wt. %. The high level of acidity has several deleterious effects on the process. Acid catalyzed cracking reactions have a tendency to depress liquid yields. Also, high catalyst acidity favors polymerization and coking reactions which depress activity. Moreover, since the catalyst is chloride dependent, the process must be operated in such a way as to retain catalyst chloride at the required effective levels. This requires careful control of feed chloride, water content, and in fact, the overall water content of the total process. During catalyst regeneration and rejuvenation proper attention must be directed to restoring the required catalyst chloride.

It has been determined that the palladium-platinum catalysts have a different chloride dependency than platinum catalysts. Since these catalysts preferentially dehydrocyclize paraffins to $C_6$ naphthenes, the need to handle $C_5$ naphthenes through acid catalyzed chemistry is diminished. This feature permits a reduction in catalyst chloride which favors yield by decreasing acid cracking and coking reactions and favors activity by decreasing polymerization and coking. It has also been established that palladium-platinum catalysts of given chloride level have a higher "apparent acidity" than platinum catalysts. This means that catalyst chloride level and chloride level control are less critical for palladium-platinum catalysts than for platinum catalysts.

This property of palladium-platinum catalysts also permits the selection of an optimum chloride level for the particular feedstock being processed. In general, paraffinic naphthas require lower chloride levels than do naphthenic naphthas when being formed over palladium-platinum catalysts. Both feeds, however, can be processed over palladium-platinum catalysts at lower chloride levels than required by platinum catalysts. The chloride levels required by palladium-platinum catalysts normally range from 0.1–0.9 wt. % as compared to >0.9 wt. % for platinum catalysts. The range 0.3–0.9 wt. % is preferred; the range 0.3–0.7 wt. % is most preferred. Paraffinic feeds better utilize chloride levels in palladium-platinum catalysts in the 0.3–0.6 wt. % range while naphthenic feeds better utilize chloride levels >0.6 wt. %.

Sulfur is a highly preferred component, the sulfur content of the catalyst generally ranging to about 0.2 percent, preferably from about 0.05 percent to about 0.1 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at from about 350° F. to about 1050° F. at about 1–40 atmospheres for the time necessary to achieve breakthrough, or the desired sulfur level.

While the catalyst may be used directly it is preferred that it be sulfided to achieve the ultimate suppression of hydrocracking during reforming. Sulfur eliminates principally the formation of excessive methane, and copper eliminates principally the formation of the $C_2+$ hydrocarbon gases. Together, however, a given amount of both copper and sulfur prove superior in the suppression of total hydrocracking than a corresponding amount of either copper or sulfur employed individually.

The several components of the catalyst are composited with a refractory inorganic oxide support material, particularly alumina. Suitably, the copper is added first to the support, and subsequently the metal hydrogenation-dehydrogenation components are added. The halogen component, particularly chlorine, is added along with the hydrogenation-dehydrogenation components, or subsequent thereto, or both. The support can contain, for example, one or more of alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g., preferably from about 100 to about 300 m$^2$/g., a bulk density of about 0.3 to 1.0 g/ml, preferably about 0.4 to 0.8 g/ml, an average pore volume of about 0.2 to 1.1 ml/g., preferably about 0.3 to 0.8 ml/g., and an average pore diameter of about 30 to 300 Å.

The metal hydrogenation-dehydrogenation components can be composited or intimately associated with the porous inorganic oxide support or carrier by various techniques known to the art such as ion-exchange, coprecipitation with the alumina in the sol or gel form, and the like. For example, the catalyst composite can be formed by adding together suitable reagents such as salts of the required metals and ammonium hydroxide or ammonium carbonate, and a salt of aluminum such as aluminum chloride or aluminum sulfate to form aluminum hydroxide. The aluminum hydroxide containing the salts can then be heated, dried, formed into pellets or extruded, and then calcined in nitrogen or other non-agglomerating atmosphere. The metal hydrogenation-dehydrogenation components are preferably added to the catalyst by impregnation, typically via an "incipient wetness" technique which requires a minimum of solution so that the total solution is absorbed, initially or after some evaportion.

Suitably, the copper, and metal hydrogenation-dehydrogenation components are deposited on a previously pilled, pelleted, beaded, extruded, or sieved particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique embodying absorption from a dilute or concentrated solution, or solutions, with subsequent filtration or evaporation to effect total uptake of the metallic components.

In compositing the metals with the carrier, essentially any soluble compound of the respective metal can be used, but a soluble compound which can be easily subjected to thermal decomposition and reduction is preferred, for example, inorganic salts such as halide, nitrate, inorganic complex compounds, or organic salts such as the complex salt of acetylacetone, amine salt, and the like. In adding the copper, copper chlorides and nitrate are a preferred source of copper on the basis of availability, cost and effectiveness.

The copper is incorporated into the catalyst at the time of its formation, or immediately thereafter, and preferably the copper is incorporated into the preformed carrier by impregnation from a solution of a soluble salt, or compound of copper; preferably in a solution of hydrochloric acid to provide good distribution of the copper. This step is carried out prior to the impregnation of the hydrogenation-dehydrogenation components. The copper, in accordance with this invention, can be added to the carrier from a solution which contains a salt, or compound of copper, and thereafter the copper impregnated support can be dried, calcined, and the hydrogenation-dehydrogenation components then added, suitably as salts or compounds dissolved in a suitable solvent, preferably water, to form a solution.

The impregnation of the palladium, platinum and rhenium components onto a carrier is carried out by impregnating the carrier with a solution, or solutions, of the respective salts or compounds of the elements or metals to be incorporated. Salts, acids or compounds of each metal can be dissolved in a solution, or the salts, acids or compounds can be separately dissolved in solutions, the solutions admixed, and the admixed solution used for impregnation of the carrier. In other words, copper is added initially using conventional techniques, and then the other metals are added simultaneously or sequentially, suitably by impregnation. The amount of impregnation solution used should be sufficient to completely immerse the carrier, usually within the range from about 1 to 20 times of the carrier by volume, depending on the metal concentration in the impregnation solution. The impregnation treatment can be carried out under a wide range of conditions including ambient or elevated temperatures and atmospheric or superatmospheric pressures.

In a preferred embodiment of the present invention a carrier is impregnated with an aqueous halogen-acid solution of the copper followed by filtration, and then treating with dilute ammonia followed by filtration and washing with water, and then the copper impregnated catalyst can be further impregnated with a solution containing a dissolved salt or compound of palladium, platinum and rhenium, or palladium, platinum, rhenium and additional metals, followed by evaporation or filtration, with subsequent drying or calcination, or both, whereby the components are dispersed substantially uniformly to the inner part of the catalyst.

The catalyst, after impregnation, is dried by heating at a temperature above about 80° F., preferably between about 150° F. and 300° F., in the presence of nitrogen or oxygen, or both, in an air stream or under vacuum. The catalyst is calcined at a temperature between about 500° F. to 1200° F., preferably about 500° F. to 1050° F., either in the presence of oxygen in an air stream or in the presence of an inert gas such as $N_2$.

The catalyst can be activated by contact with air at temperatures ranging from about 500° F. to about 1050° F. for periods ranging from about 1 to about 24 hours in either flowing or static air. Reduction is performed by contact with flowing hydrogen at temperatures ranging from about 350° F. to about 1050° F. for periods ranging from about 0.5 to about 24 hours at about 1–40 atm. The catalyst can be sulfided by use of a blend of $H_2S/H_2$ and the sulfiding is performed at temperature ranging from about 350° F. to about 1050° F. at about 1–40 atm. for a time necessary to achieve breakthrough, or the desired sulfur level. Post-sulfiding stripping can be employed if desired at conditions similar to those for reduction of the catalyst.

Treatment of the catalyst with a mixture of chlorine and oxygen can be substituted for air activation if desired. This procedure can correct for any possible maldistribution of the metals arising from improper impregnation, and the procedure is useful in restoring activity during regeneration-rejuvenation after on oil service. A blend of chlorine, oxygen and nitrogen can also be employed at temperatures ranging from about 350° F. to about 1050° F. for periods ranging from about 1 to about 24 hours at 1–40 atm. Treat times for these various operations are a function of gas flow rates, gas compositions, and conditions. The catalyst halide content can be controlled during impregnation, or adjusted by treatment with water or water-hydrogen chloride blends.

This catalyst can be used in semi-regenerative, cyclic, semicyclic, or continuous bed reforming. The catalyst is particularly useful at severe reforming conditions, especially at low pressures, or pressures ranging from about 50 psig to about 150 psig, where maximum yield is favored.

The feed or charge stock can be a virgin naphtha, cracked naphtha, a Fischer-Tropsch naphtha, or the like. Typical feeds are those hydrocarbons containing from about 5 to 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 20 to about 80 Vol. % paraffins, both normal and branched, which fall in the range of about $C_5$ to $C_{12}$, from about 10 to 80 Vol.% of naphthenes falling within the range of fro'qbout $C_6$ to $C_{12}$, and from 5 through 20 Vol.% of the desirable aromatics falling within the range of from about $C_6$ to $C_{12}$.

The reforming runs are initiated by adjusting the hydrogen and feed rates, and the temperature and pressure to operating conditions. The run is continued at optimum reforming conditions by adjustment of the major process variables, within the ranges described below:

| Major Operating Variables | Typical Process Conditions | Preferred Process Conditions |
|---|---|---|
| Pressure, Psig | 50–750 | 100–300 |
| Reactor Temp., °F. | 750–1100 | 850–1000 |
| Gas Rate, SCF/B (Incl. Recycle Gas) | 1500–10,000 | 2000–7000 |
| Feed Rate, W/Hr/W | 0.5–10 | 1–3 |

The invention will be more fully understood by reference to the following demonstrations and examples which present comparative data illustrating its more salient features. All parts are given in terms of weight except as otherwise specified.

EXAMPLE 1

A Pt catalyst, a Pd catalyst, and a series of Pd-Pt catalysts were prepared by impregnation of stock solutions of $H_2PtCl_6$ and $PdCl_4$ onto commercially supplied high purity gamma alumina. The metal content of all catalysts ranged from 0.3–0.4 wt. %. The catalysts were treated in air at 750° F. and were reduced with hydrogen at 932° F. The catalysts were evaluated for heptane reforming at 500° C., 1 atm., 2.5 W/H/W, $H_2$/heptane ~37. The results of these experiments are summarized in Table I.

Catalyst activity, as measured by the rate of toluene formation, is found to be minimal for pure Pd and rises to a maximun for pure Pt. The bulk of the activity increase occurs over the range of 20–60 mol % Pt and essentially plateaus beyond the 60 mol % level. Catalyst deactivation, on the other hand, is highest for pure Pd and reaches a minimum value at 20–50 mol % Pt before increasing to that of 100% Pt. The coking tendency of these catalysts is greatest for Pt, least for Pd, and intermediate for the Pd-Pt catalysts in the 20–50 mol % Pt range. The data in combination show that Pd-Pt catalysts containing 20–60 mol % Pt are superior to pure Pd, pure Pt, and Pd-Pt catalysts outside of the mol % Pt specified. Weight % compositions of two Pd-Pt catalysts are shown for the corresponding mol % Pt contents. These data show that Pd-Pt catalysts should possess these metal contents for superior performance.

TABLE I

| | HEPTANE REFORMING 1 atm., 500° C., 2.5 W/H/W, $H_2$/oil ~37 | | |
|---|---|---|---|
| Mole % Pt in Pd-Pt | Initial Aromatization Activity | Deactivation Rate | Wt. % Coke |
| 0 | 1.09 | 0.30 | 0.22 |
| 14[1] | 2.03 | 0.18 | 0.52 |
| 21 | 2.12 | 0.15 | — |
| 31[2] | 2.68 | 0.19 | 0.53 |
| 52 | 2.62 | 0.22 | — |
| 100 | 2.87 | 0.25 | 0.82 |

[1] 0.3 wt. % Pd-0.1 wt. % Pt
[2] 0.15 wt. % Pd-0.15 wt. % Pt

EXAMPLE 2

Two Pd catalysts and two Pt catalysts were prepared by impregnating stock solutions onto alumina and silica. The alumina based catalysts were sodium carbonate treated to remove catalyst acidity. The acid strength of these catalysts was inadequate for the isomerization of naphthenes and the catalysts were suited to the direct measurement of dehydrocyclization selectivity. Heptane was reformed over these catalysts at 500° C., 100 psig, 10 W/H/W, $H_2$/heptane=5. The results are shown in Table II.

TABLE II

Heptane Reforming Over Non-Acidic Catalysts

| Catalyst | Mol % $C_6$ Naphthenes |
|---|---|
| 0.3 Pt-$Al_2O_3$ | 32 |
| 0.3 Pd-$Al_2O_3$ | 88 |
| 0.15 Pt-$SiO_2$ | 51 |
| 0.15 Pd-$SiO_2$ | 99 |

The preference for $C_6$ naphthene formation over Pd is apparent.

EXAMPLE 3

A 0.3 Pt-0.3 Re catalyst and a 0.3 Pd-0.3 Re catalyst were prepared by impregnation of metal stock solutions onto alumina. The catalysts were air activated, reduced, and sulfided. Both catalysts were analyzed for chloride and sulfur: Pt, 1.02% Cl, 0.064% S; Pd, 0.88 Cl, 0.045 S. Both catalysts were evaluated in heptane reforming at space velocities selected to give ~50% conversion. Results are given in Table III.

TABLE III

Heptane Reforming 500° C., 1 atm., $H_2$/heptane-37/1

| Catalyst | W/H/W | Iso-heptanes, % | Aromatics, % |
|---|---|---|---|
| Pt-Re | 4 | 14.2 | 73.0 |
| Pd-Re | 2.5 | 4.5 | 77.2 |

The data shows that substitution of Pd for Pt gave a catalyst of lower activity. At the same conversion level, however, the Pd catalyst produced less isomerized product and more aromatics consistent with preferential formation of $C_6$ naphthenes.

EXAMPLE 4

A Pd-Pt-Re catalyst and a Pd-Pt-Re-Cu catalyst were prepared by impregnation of metal stock solutions onto alumina. The catalysts contained nominally 0.3 Pd-0.1 Pt-0.2 Re-0.05 Cu-0.05 S-0.9 Cl. These catalysts and the catalysts of Example 3 were evaluated for heptane reforming at standard conditions. All catalysts were air activated, reduced, and sulfided. The results given in Table IV show that the substitution of Pd for Pt gave a poor activity catalyst. The addition of Pt to Pd-Re at the composition disclosed in this invention improved activity significantly. Promotion with copper gave additional activity and selectivity improvement and provided a catalyst superior to Pt-Re.

TABLE IV

Heptane Reforming 500° C., 1 atm., 2.5 W/H/W, $H_2$/heptane-37

| Catalyst | Conversion, % | Aromatics, % | Aromatic Yield, % |
|---|---|---|---|
| Pt-Re | 82.5 | 77.2 | 63.7 |
| Pd-Re | 49.5 | 77.2 | 38.2 |
| Pd-Pt-Re | 70.2 | 70.7 | 49.6 |
| Pd-Pt-Re-Cu | 81.6 | 80.2 | 65.4 |

EXAMPLE 5

A series of Pd-Pt-Re-Cu catalysts were prepared by the impregnation of metal stock solutions onto alumina. These catalysts represented a range of Cu:Pd+Pt+Re mol ratios. The catalysts were evaluated for heptane reforming at standard conditions. The results given in Table V show an optimum range of the mol ratio of copper to the other metals as measured by toluene formation. The data show superior performance at Cu:-metals ratios in the preferred range of about 0.05:1 to about 0.4:1.

TABLE V

Heptane Reforming 500° C., 1 atm., 2.5 W/H/W, $H_2$/heptane = 37

| Cu/Pd-Pt-Re:Mol Ratio | Toluene yield, Wt. % @ 2 Hr. |
|---|---|
| 0 | 33 |
| 0.10 | 62 |
| 0.26 | 49 |
| 0.31 | 48 |
| 0.38 | 38 |
| 0.74 | 28 |
| 0.91 | 22 |

EXAMPLE 6

The catalysts of Example 4 were evaluated for reforming a petroleum naphtha, having the inspections given in Table VI-A.

TABLE VI-A

| ASTM Distillation, °F. | |
|---|---|
| Initial | 145 |
| 10 | 181 |
| 20 | 204 |
| 30 | 222 |
| 40 | 240 |
| 50 | 258 |
| 60 | 275 |
| 70 | 293 |
| 80 | 313 |
| 90 | 334 |
| Final B.P. | 363 |
| Octane No., RON Clear | 38.4 |
| Gravity, °API | 59.7 |
| Sulfur, Wt. ppm | <0.1 |
| Water, Wt. ppm | 7 |
| Chlorine, Wt. ppm | <0.1 |
| Analysis, Vol. Percent | |
| Paraffins | 69.5 |
| Naphthenes | 16.9 |
| Aromatics | 13.6 |

These data, given in Table VI-B, continue to illustrate that the substitution of Pd for Pt gave a poor catalyst in terms of yield and activity in naphtha reforming. The addition of Pt to Pd-Re in the mol ratio disclosed in this invention provided a catalyst comparable to Pt-Re and vastly superior to Pd-Re. Further promotion by copper gave additional catalyst performance credits. The Pd-Pt catalysts also produced less catalyst coke as shown by EOR coke levels for nearly equivalent run lengths in terms of EOR activity. This property is apparent from the coking rates which are 1.5–2 times greater for Pt-Re than for the Pd-Pt catalysts. Pd-Re gave a different distribution of aromatics in the product than did Pt-Re. This distribution was unaffected by the addition of either Pt or Cu to Pd-Re. The basic reforming chemistry of Pd is not altered by the presence of these metals, and more importantly the addition of Pt does not convert the Pd-Pt catalyst to one in which Pt chemistry dominates. The shift in aromatic distribution and the low coking activity of these Pd catalysts is consistent with selective $C_6$ naphthene formation.

TABLE VI-B

| Reforming of Low Sulfur Fos Paraffinic Feed 930° F., 200 psig, 5000 SCF/B, 1.4 W/H/W | | | | |
|---|---|---|---|---|
| Catalyst | Pt-Re | Pd-Re | Pd-Pt-Re | Pd-Pt-Re-Cu |
| Relative Activity | 7.7 | 1.0 | 6.8 | 8.3 |
| $C_5$+ LV% @ 100 RON | 71.7 | 26.0 | 71.6 | 72.4 |
| EOR Coke, wt. % | 6.3 | 2.3 | 5.7 | 5.8 |
| Coke Rate, %/Hr. | 0.013 | 0.011 | 0.009 | 0.007 |
| Aromatic Distribution, % | | | | |
| $C_6$-$C_8$ | 70 | 60 | 60 | 60 |
| $C_9$+ | 30 | 40 | 40 | 40 |

EXAMPLE 7

A Pd-Pt-Re-Cu catalyst was prepared as described above in Example 4. The catalyst composition was 0.15 Pd-0.15 Pd-0.30 Re-0.04 Cu-0.79 Cl-0.077 S. The catalyst was evaluated for naphtha reforming at identical conditions as in Example 6. The relative activity was 7.9 and the $C_5$+ liquid yield was 72.6. Aromatic distribution was 60/40. The coke rate was 0.006%/Hr. The results in conjunction with those of Example 6 illustrate the compositional range for Pd-Pt catalysts as disclosed above.

EXAMPLE 8

A series of Pt-Re and Pd-Re catalysts were prepared as described in Example 3 except that the catalyst chloride levels were varied. The catalysts were tested in heptane reforming. The data, as given in Table VII, show a clear dependency on chloride content for Pt while Pd activity is insensitive to chloride level. Pd selectivity is favored by lower chloride while that of Pt is favored by higher chloride. The chloride sensitivity of Pt arises from the need to handle the $C_5$ naphthenes formed during dehydrocyclization. The preference for $C_6$ naphthenes over Pd renders this catalyst less dependent on catalyst acidity.

TABLE VII

| Heptane Reforming 500° C., 1 atm., 2.5 W/H/W, $H_2$/heptane = 37 | | | |
|---|---|---|---|
| Catalyst | Wt. % Cl | Conversion, % | Aromatics, % |
| 0.3 Pt-0.3 Re | 0.58 | 51 | 68 |
| 0.3 Pt-0.3 Re | 1.02 | 62 | 74 |
| 0.3 Pd-0.3 Re | 0.86 | 50 | 77 |
| 0.3 Pd-0.3 Re | 0.52 | 51 | 82 |

EXAMPLE 9

A series of various Pt catalysts, Pd catalysts, and Pd-Pt catalysts with a range of chloride contents were prepared by the procedure of Example 3. The catalysts were used for heptane reforming. Experience has shown that the formation of isobutane from heptane is a sensitive diagnostic probe for the measurement of catalyst acidity. The results of these experiments are tabulated in the figure for the rate of isobutane formation as a function of catalyst chloride (acidity). These data clearly show that as acidity increases the formation of isobutane increases. The data also illustrate that for any given chloride level the apparent acidity of the Pd catalysts is greater than that of the Pt catalysts. Since the formation of isobutane reduces liquid yield, it follows that reducing catalyst acidity favors the production of liquid. Example 7 has shown that Pt catalysts are sensitive to a reduction of chloride level, but Pd catalysts are not. Thus, Pd catalysts may be operated at lower chloride levels which reduces isobutane formation and increases liquid yield. The figure shows that a Pd catalyst with 0.8% chloride is at parity with a Pt catalyst at 1.0% chloride. At chloride levels <0.8% Pd catalysts surpass Pt catalysts and give higher liquid yields due to the suppression of acid cracking. The dependency of yield on catalyst acidity as measured by isobutane formation is illustrated in Table VIII for heptane reforming at 500° C., 100 psig, 10 W/H/W, $H_2$/heptane=5.

TABLE VIII

| Heptane Reforming 500° C., 100 psig, 10 W/H/W | | |
|---|---|---|
| Isobutane, Wt. % | $C_5$+, Wt. % | Toluene, Wt. % |
| 4.1 | 74.8 | 27.7 |
| 3.5 | 77.4 | 28.2 |
| 3.1 | 82.0 | 30.2 |

EXAMPLE 10

A series of 0.3 Pd-0.2 Re-0.1 Pt-0.05 Cu-0.08 S catalysts of varying chloride content were prepared as described above in Example 4. The catalysts were evaluated for naphtha reforming. The data given in Table IX illustrate improvement in activity and yield as catalyst chloride is decreased.

TABLE IX

| Reforming of Low Sulfur Fos Paraffinic Feed 930° F., 200 psig, 5000 SCF/B, 1.4 W/H/W | | |
|---|---|---|
| Wt. % Cl | Relative Activity | $C_5$+ LV % @ 100 RON |
| 1.07 | 1.0 | 68.8 |
| 0.90 | 1.2 | 69.1 |
| 0.71 | 1.3 | 72.4 |

EXAMPLE 11

The catalyst of Example 7 was used to reform a paraffinic naphtha at high severity cyclic conditions. The data show the catalyst to be stable under high severity conditions for typical cycle lengths of 10–25 hrs. The catalyst shows good yield stability at these conditions for prolonged periods.

TABLE X

| Cyclic Reforming of Low Sulfur Fos Paraffinic Feed 950° F. 175 psig, 3000 SCF/B, 2.5 W/H/W | | |
|---|---|---|
| Hrs. On Oil | $C_5$+ LV % at 100 RON | Relative Activity |
| 15 | 75.3 | 1.8 |
| 25 | 74.4 | 1.7 |
| 150 | 73.5 | 1.0 |

EXAMPLE 12

The catalyst of Example 7 was used to reform a paraffinic naphtha at 100 psig. The data of Table XI taken at 400 hr. on oil illustrate a yield and activity credit for the Pd-Re-Pt-Cu catalyst compared with a conventional Pt-Re catalyst under the severe conditions of low pressure reforming.

TABLE XI

Low Pressure Reforming of Low Sulfur Eos Paraffinic Feed
930° F. 100 psig, 5000 SCF/B, 1.4 W/H/W

| Catalyst | Relative Activity | $C_5^+$ LV % @ 100 RON |
|---|---|---|
| Pt-Re | 1.0 | 75.4 |
| Pd-Re-Pt-Cu | 1.3 | 77.0 |

It is apparent that various modifications and changes can be made without departing the spirit and scope of the present invention, outstanding features of which are that reforming catalysts based on palladium and platinum in selected critical ratios, with specified halide content and containing various other hydrogenation-dehydrogenation components and promoters are superior to conventional palladium and platinum catalysts in providing good activity, activity maintenance and yield even at high severity conditions.

What is claimed is:

1. A catalyst composition useful for upgrading naphthas by reforming to produce higher octane gasolines which comprises palladium and platinum in total concentration ranging from about 0.2 to about 0.6 percent, with from about 15 to about 50 mol. percent of the composition being platinum, as contrasted with the amount of palladium contained in the composition, from about 0.1 to about 2 percent rhenium, and from about 0.01 to about 0.1 percent copper, composited with an inorganic oxide support.

2. The composition of claim 1 wherein the catalyst contains from about 0.3 to about 0.4 percent total palladium and platinum.

3. The composition of claim 1 wherein the catalyst contains from about 0.2 to about 0.6 percent rhenium.

4. The composition of claim 1 wherein the catalyst contains from about 0.2 to about 0.6 percent rhenium and from about 0.025 to about 0.08 percent copper.

5. The composition of claim 1 wherein the catalyst contains from about 0.5 to about 0.9 percent halogen.

6. The composition of claim 5 wherein the catalyst contains from about 0.6 to about 0.7 percent halogen.

7. The composition of claim 1 wherein the catalyst contains from about 0.2 to about 0.6 percent rhenium, from about 0.025 to about 0.08 percent copper, the catalyst is sulfided, and contains up to about 0.2 percent sulfur.

8. The composition of claim 1 wherein the catalyst contains from about 0.05 to about 0.1 percent sulfur.

9. The composition of claim 1 wherein the platinum and rhenium are employed in weight ratios of palladium plus platinum:rhenium ranging from about 0.15 to about 4:1.

10. The composition of claim 9 wherein the weight ratio of palladium plus platinum:rhenium ranges from about 0.50:1 to about 2:1.

11. The composition of claim 1 wherein the copper is employed at mol ratios of copper:(palladium plus platinum plus rhenium) ranging from about 0.05:1 to about 0.4:1.

12. The composition of claim 11 wherein the mol ratio of copper:(palladium plus platinum plus rhenium) ranges from about 0.075:1 to about 0.35:1.

13. The composition of claim 11 wherein the mol ratio of copper:(palladium plus platinum plus rhenium) ranges from about 0.1:1 to about 0.3:1.

14. The composition of claim 4 wherein the catalyst contains from about 0.5 to about 0.9 percent halogen.

15. The composition of claim 4 wherein the catalyst contains from about 0.5 to about 0.9 percent halogen, the catalyst is sulfided, and contains from about 0.05 to about 0.1 percent sulfur.

16. The composition of claim 4 wherein the catalyst contains palladium, platinum and rhenium in weight ratios palladium plus platinum:rhenium ranging from about 0.25:1 to about 1.75:1.

* * * * *